US010152723B2

(12) United States Patent
Warner et al.

(10) Patent No.: US 10,152,723 B2
(45) Date of Patent: Dec. 11, 2018

(54) METHODS AND SYSTEMS FOR IDENTIFYING NEW COMPUTERS AND PROVIDING MATCHING SERVICES (75) Inventors: Craig Warner, Palo Alto, CA (US); Timothy O'Connor, Moraga, CA (US); Alexander Ross, San Jose, CA (US)

(73) Assignee: Google LLC, Mountain View, CA (US)

( * ) Notice: Subject to any disclaimer, the term of this patent is extended or adjusted under 35 U.S.C. 154(b) by 1066 days.

(21) Appl. No.: 13/478,998

(22) Filed: May 23, 2012

(65) Prior Publication Data
US 2013/0317905 A1 Nov. 28, 2013

(51) Int. Cl.
G06Q 30/02 (2012.01)

(52) U.S. Cl.
CPC ................... G06Q 30/02 (2013.01)

(58) Field of Classification Search
None
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,749,069 A | 5/1998 | Komori et al. |
| 5,848,397 A | 12/1998 | Marsh et al. |
| 5,850,433 A | 12/1998 | Rondeau |
| 5,948,061 A | 9/1999 | Merriman et al. |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman et al. |
| 6,167,382 A | 12/2000 | Sparks et al. |
| 6,189,003 B1 | 2/2001 | Leal |
| 6,259,127 B1 | 7/2001 | Pan |
| 6,269,361 B1 | 7/2001 | Davis et al. |
| 6,275,806 B1 | 8/2001 | Pertrushin |
| 6,332,127 B1 | 12/2001 | Bandera et al. |
| 6,401,075 B1 | 6/2002 | Mason et al. |
| 6,600,930 B1 | 7/2003 | Sakurai et al. |
| 6,647,257 B2 | 11/2003 | Owensby |

(Continued)

FOREIGN PATENT DOCUMENTS

| | | |
|---|---|---|
| EP | 1 271 458 | 1/2003 |
| EP | 1 286 288 | 2/2003 |

(Continued)

OTHER PUBLICATIONS

International Search Report & Written Opinion on PCT/US2013/042376 dated Feb. 28, 2014.

(Continued)

Primary Examiner — Fonya M Long
Assistant Examiner — Rashida R Shorter
(74) Attorney, Agent, or Firm — Foley & Lardner LLP (57) ABSTRACT A method of providing services to computing devices includes establishing a connection over the Internet with a computing device; receiving data from the computing device during the connection; extracting a signal from the data received from the computing device; estimating a relative age of the computing device based on the extracted signal; selecting a service from a plurality of services based on the estimated relative age of the computing device; and providing the selected service to the computing device.

21 Claims, 3 Drawing Sheets

(56) References Cited

U.S. PATENT DOCUMENTS

| | | | |
|---|---|---|---|
| 6,665,293 | B2 | 12/2003 | Thornton et al. |
| 6,677,894 | B2 | 1/2004 | Sheynblat et al. |
| 6,684,249 | B1 | 1/2004 | Frerichs et al. |
| 6,857,007 | B1 | 2/2005 | Bloomfield |
| 6,956,816 | B1 | 10/2005 | Alexander et al. |
| 6,983,331 | B1 | 1/2006 | Mitchell et al. |
| 6,985,882 | B1 | 1/2006 | Del Sesto |
| 7,016,343 | B1 | 3/2006 | Mermel et al. |
| 7,039,599 | B2 | 5/2006 | Merriman et al. |
| 7,120,235 | B2 | 10/2006 | Altberg et al. |
| 7,136,875 | B2 | 11/2006 | Anderson et al. |
| 7,376,640 | B1 | 5/2008 | Anderson et al. |
| 7,406,434 | B1 | 7/2008 | Chang et al. |
| 7,613,637 | B2 | 11/2009 | Chan et al. |
| 7,668,950 | B2 | 2/2010 | Horowitz et al. |
| 7,853,255 | B2 | 12/2010 | Karaoguz et al. |
| 7,904,460 | B2 * | 3/2011 | Armour ............ G06F 17/30949 707/688 |
| 8,068,604 | B2 | 11/2011 | Leeds et al. |
| 8,195,133 | B2 | 6/2012 | Ramer et al. |
| 8,204,881 | B2 | 6/2012 | Holt et al. |
| 8,214,342 | B2 | 7/2012 | Meiresonne |
| 8,234,275 | B2 | 7/2012 | Grant et al. |
| 8,386,386 | B1 | 2/2013 | Zhu |
| 8,453,058 | B1 | 5/2013 | Coccaro et al. |
| 8,762,156 | B2 | 6/2014 | Chen |
| 8,903,716 | B2 | 12/2014 | Chen et al. |
| 9,275,637 | B1 | 3/2016 | Salvador et al. |
| 9,318,107 | B1 | 4/2016 | Sharifi |
| 9,424,841 | B2 | 8/2016 | Foerster et al. |
| 9,542,941 | B1 | 1/2017 | Weksler et al. |
| 9,653,075 | B1 | 5/2017 | Chen et al. |
| 2001/0020236 | A1 | 9/2001 | Cannon |
| 2001/0025275 | A1 | 9/2001 | Tanaka et al. |
| 2002/0029226 | A1 | 3/2002 | Li et al. |
| 2002/0042829 | A1 | 4/2002 | Mizuhara et al. |
| 2002/0077130 | A1 | 6/2002 | Owensby |
| 2002/0082938 | A1 | 6/2002 | Borger et al. |
| 2002/0091571 | A1 | 7/2002 | Thomas et al. |
| 2002/0128908 | A1 | 9/2002 | Levin et al. |
| 2002/0161646 | A1 | 10/2002 | Gailey et al. |
| 2002/0164977 | A1 | 11/2002 | Link, II et al. |
| 2002/0188680 | A1 | 12/2002 | McCormack et al. |
| 2003/0008661 | A1 | 1/2003 | Joyce et al. |
| 2003/0018479 | A1 | 1/2003 | Oh et al. |
| 2003/0028529 | A1 | 2/2003 | Cheung et al. |
| 2003/0032409 | A1 | 2/2003 | Hutcheson et al. |
| 2003/0033292 | A1 | 2/2003 | Meisel et al. |
| 2003/0046161 | A1 | 3/2003 | Kamangar et al. |
| 2003/0061211 | A1 | 3/2003 | Shultz et al. |
| 2003/0105677 | A1 | 6/2003 | Skinner |
| 2003/0125977 | A1 | 7/2003 | Morioka et al. |
| 2003/0154072 | A1 | 8/2003 | Young et al. |
| 2003/0220835 | A1 | 11/2003 | Barnes, Jr. |
| 2004/0023666 | A1 | 2/2004 | Moon et al. |
| 2004/0043770 | A1 | 3/2004 | Amit et al. |
| 2004/0044565 | A1 | 3/2004 | Kumar et al. |
| 2004/0044571 | A1 | 3/2004 | Bronnimann et al. |
| 2004/0059712 | A1 | 3/2004 | Dean et al. |
| 2004/0076279 | A1 | 4/2004 | Taschereau |
| 2004/0083133 | A1 | 4/2004 | Nicholas et al. |
| 2004/0085894 | A1 | 5/2004 | Wang et al. |
| 2004/0120323 | A1 | 6/2004 | Viikari et al. |
| 2004/0172389 | A1 | 9/2004 | Galai et al. |
| 2004/0220778 | A1 | 11/2004 | Imai et al. |
| 2005/0065999 | A1 | 3/2005 | Acharya et al. |
| 2005/0074102 | A1 | 4/2005 | Altberg et al. |
| 2005/0076017 | A1 | 4/2005 | Rein et al. |
| 2005/0086104 | A1 | 4/2005 | McFadden |
| 2005/0097204 | A1 | 5/2005 | Horowitz et al. |
| 2005/0137939 | A1 | 6/2005 | Calabria et al. |
| 2005/0144065 | A1 | 6/2005 | Calabria et al. |
| 2005/0144069 | A1 | 6/2005 | Wiseman et al. |
| 2005/0225810 | A1 | 10/2005 | Sun |
| 2005/0234879 | A1 | 10/2005 | Zeng et al. |
| 2006/0004627 | A1 | 1/2006 | Baluja |
| 2006/0149624 | A1 | 7/2006 | Baluja et al. |
| 2006/0195819 | A1 | 8/2006 | Chory et al. |
| 2006/0247913 | A1 | 11/2006 | Huerta et al. |
| 2006/0274869 | A1 * | 12/2006 | Morse ............... G06F 17/30905 375/352 |
| 2006/0287919 | A1 | 12/2006 | Rubens et al. |
| 2007/0097975 | A1 | 5/2007 | Rakers et al. |
| 2007/0127688 | A1 | 6/2007 | Doulton |
| 2007/0282612 | A1 | 12/2007 | Kaneko et al. |
| 2007/0294229 | A1 | 12/2007 | Au |
| 2008/0021604 | A1 | 1/2008 | Bouvier et al. |
| 2008/0049696 | A1 | 2/2008 | Stewart |
| 2008/0052219 | A1 | 2/2008 | Sandholm et al. |
| 2008/0071536 | A1 | 3/2008 | Nagashima |
| 2008/0103781 | A1 | 5/2008 | Wasson et al. |
| 2008/0270223 | A1 | 10/2008 | Collins et al. |
| 2008/0270224 | A1 | 10/2008 | Portman et al. |
| 2008/0305778 | A1 * | 12/2008 | Aaltonen et al. .......... 455/414.1 |
| 2009/0210491 | A1 | 8/2009 | Thakkar et al. |
| 2009/0228281 | A1 | 9/2009 | Singleton et al. |
| 2009/0240670 | A1 | 9/2009 | Tiyyagura et al. |
| 2010/0306229 | A1 | 12/2010 | Timm et al. |
| 2011/0010240 | A1 | 1/2011 | Veach |
| 2011/0022460 | A1 | 1/2011 | Bhatia et al. |
| 2011/0087660 | A1 | 4/2011 | Yu et al. |
| 2011/0202494 | A1 | 8/2011 | Shin et al. |
| 2011/0264644 | A1 | 10/2011 | Grant et al. |
| 2011/0295990 | A1 | 12/2011 | St Jean et al. |
| 2011/0307436 | A1 | 12/2011 | Cai et al. |
| 2012/0016897 | A1 | 1/2012 | Tulumbas et al. |
| 2012/0030015 | A1 | 2/2012 | Brunsman et al. |
| 2012/0036226 | A1 | 2/2012 | Chor |
| 2012/0101776 | A1 | 4/2012 | Brower et al. |
| 2012/0102020 | A1 | 4/2012 | Pearson |
| 2012/0138671 | A1 | 6/2012 | Gaede et al. |
| 2012/0155838 | A1 | 6/2012 | Gerhards et al. |
| 2012/0158954 | A1 | 6/2012 | Heffernan et al. |
| 2012/0166277 | A1 | 6/2012 | Gnanamani et al. |
| 2012/0265528 | A1 | 10/2012 | Gruber et al. |
| 2012/0297174 | A1 * | 11/2012 | Frank et al. ...................... 713/1 |
| 2013/0013749 | A1 | 1/2013 | Kane et al. |
| 2013/0073400 | A1 | 3/2013 | Heath |
| 2013/0117022 | A1 | 5/2013 | Chen et al. |
| 2013/0124606 | A1 | 5/2013 | Carpenter et al. |
| 2013/0144720 | A1 | 6/2013 | Hari et al. |
| 2013/0185074 | A1 | 7/2013 | Gruber et al. |
| 2013/0275164 | A1 | 10/2013 | Gruber et al. |
| 2013/0304758 | A1 | 11/2013 | Gruber et al. |
| 2013/0325449 | A1 | 12/2013 | Levien et al. |
| 2014/0095583 | A1 | 4/2014 | Houle |
| 2014/0229184 | A1 | 8/2014 | Shires |
| 2014/0337028 | A1 | 11/2014 | Wang et al. |
| 2014/0350938 | A1 | 11/2014 | Schroeter |
| 2015/0081288 | A1 | 3/2015 | Kim |
| 2015/0106085 | A1 | 4/2015 | Lindahl |
| 2015/0221305 | A1 | 8/2015 | Sharifi |
| 2016/0180846 | A1 | 6/2016 | Lee |
| 2016/0217790 | A1 | 7/2016 | Sharifi |
| 2016/0223640 | A1 | 8/2016 | Vilermo et al. |
| 2017/0069317 | A1 | 3/2017 | Kwon |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0147585 | A1 | 5/2017 | Kleindienst et al. |
| 2017/0358301 | A1 | 12/2017 | Raitio et al. |

FOREIGN PATENT DOCUMENTS

| | | |
|---|---|---|
| GB | 2 305 747 | 4/1997 |
| JP | 11-065950 | 1/1900 |
| JP | 11-265347 | 9/1999 |
| JP | 2001-236410 | 8/2001 |
| JP | 2001-282982 | 10/2001 |
| JP | 2001-297256 | 10/2001 |
| JP | 2001-312646 | 11/2001 |
| JP | 2002-007253 | 1/2002 |
| JP | 2002-016970 | 1/2002 |

(56) References Cited

FOREIGN PATENT DOCUMENTS

| | | |
|---|---|---|
| JP | 2002-073666 | 3/2002 |
| JP | 2002-099822 | 4/2002 |
| JP | 2002-132827 | 5/2002 |
| JP | 2002-140359 | 5/2002 |
| JP | 2002-169744 | 6/2002 |
| JP | 2002-170027 | 6/2002 |
| JP | 2002-245048 | 8/2002 |
| JP | 2002-288541 A | 10/2002 |
| JP | 2003-016348 | 1/2003 |
| JP | 2003-122781 | 4/2003 |
| JP | 2003-223591 | 8/2003 |
| JP | 2003-263584 | 9/2003 |
| JP | 2003-337893 | 11/2003 |
| JP | 2004-032037 | 1/2004 |
| JP | 2011-192102 | 9/2011 |
| KR | 200054165 | 9/2000 |
| KR | 2002-69767 | 9/2002 |
| KR | 2003-39736 | 5/2003 |
| WO | WO-97/21183 A | 6/1997 |
| WO | WO-00/42544 | 7/2000 |
| WO | WO 01/59546 A2 | 8/2001 |
| WO | WO-01/93138 | 12/2001 |
| WO | WO-2012/094329 | 7/2012 |

OTHER PUBLICATIONS

U.S. Appl. No. 95/001,061, Reexamination of Stone et al.
U.S. Appl. No. 95/001,068, Reexamination of Stone et al.
U.S. Appl. No. 95/001,069, Reexamination of Stone et al.
U.S. Appl. No. 95/001,073, Reexamination of Stone et al.
Best practices for creating adaptive user interfaces with the mobile Internet toolkit:, Microsoft Corporation, Jan. 2002, pp. 1-2. Downloaded Dec. 21, 2006 from http://msdn.microsoft.com/library/default.asp?url=/library/en- us/dnmitta/html/bestpractaui.asp.
"eStara Push to Talk: The most popular click to call service in the world," downloaded from htto://www.estara.com on Jun. 29, 2004, 2 pgs.
"Ingenio: Click to Call Solutions," downloaded fromhttp://www.in2enio.com/documents/cominfo/clicktocall.aso?TF=I on Jun. 29, 2004, 3 pgs.
"Walmart and Google to offer voice-enabled shopping", BBC News, Aug. 23, 2017.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Baseview Products, Inc., AdManagerPro Administration Manual v. 2.0, Dec. 1998.
Baseview Products, Inc., ClassManagerPro Administration Manual v. 1.0.5, Feb. 1, 1997.
Broussard, Mitchel, "Chatbot-Like Siri Patent Includes Intelligent Image, Video, and Audio Recognition Within Messages", May 11, 2017, 11 pages.
Business Wire, "Global Network, Inc. Enters Into Agreement in Principle With Major Advertising Agency," Oct. 4, 1999.
Canadian Office Action on 2572468 dated Dec. 4, 2014.
Canadian Office Action on 2572468 dated Sep. 17, 2013.
Canadian Office Action on 2572471 dated Jan. 9, 2014.
Canadian Office Action on CA 2,572,471 dated Mar. 3, 2015.
Canadian Office Action to Canadian Patent Application No. 2,572,471 dated Mar. 16, 2009.
Chapter 12, Managing the Product, Class Notes, University of Delaware, http://www.udel.edu/alex/chapt12.html, accessed Mar. 13, 2015, 10 pgs.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time.com (2 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Decision of Rejection for Japanese Patent Application No. 2007-519374, dated Jun. 15, 2010 (3 pgs.) with translation (3 pgs.).
Decision of Rejection for Japanese Patent Application No. 2007-519407 dated Feb. 23, 2010.
Decision to Dismiss the Amendment for Korean Patent Application No. 10-2007-7002383 dated Jul. 9, 2010.
Dedrick, R., A Consumption Model for Targeted Electronic Advertising, Intel Architecture Labs, IEEE, 1995.
Dedrick, R., Interactive Electronic Advertising, IEEE, 1994.
Dickinger et al., "An Investigation and Conceptual Model of SMS Marketing," Proceedins of the 37th Hawaii International Conference on System Sciences, 2004, 10 pages.
European Office Action for EP Application No. 05763971.8, dated Mar. 29, 2011.
European Office Action on 05768157.9 dated Jan. 27, 2014.
European Office Action on EP 05 768 157.9 dated Aug. 21, 2014.
European Office Action on EP 05 768 157.9 dated Jul. 23, 2015.
Examiner's First Report on Australian Patent Application No. 2005259861 dated Mar. 6, 2008 (2 pgs.).
Examiner's First Report to Australian Patent Application No. 2005260566 dated Mar. 4, 2008.
Examiner's Re-Examination Report for Australian Patent Application No. 2005259861, dated Dec. 1, 2011 (2 pgs.).
Examiner's Report for Canadian Patent Application No. 2,572,468, dated Dec. 29, 2011 (4 pgs.).
First Examination Report for Indian Patent Application No. 144/MUMNP/2007, dated Jun. 19, 2008.
First Office Action for Japanese Patent Application No. 2010-142707 dated Nov. 13, 2012.
First Office Action for Japanese Patent Application No. 2010-232591, dated Feb. 19, 2013 (3 pgs.) with translation (4 pgs.).
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers Newsletter "Google Assistant SDK", developers.google.com, retrieved on Jul. 12, 2017, 2 pages.
Gurma, Mark and Webb, Alex, "Apple Is Manufacturing a Sid Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.

(56) References Cited

OTHER PUBLICATIONS

International Search Report on International Application No. PCT/US2005/023023, dated Oct. 23, 2006, 2 pages.
Japanese Decision of Rejection on 2010-232591 dated Jan. 27, 2014.
Japanese Office Action issued in JP application 2010-142707 dated Jul. 23, 2013.
Japanese Office Action on JP 2014-010608 dated Nov. 18, 2014, 12 pages.
Japanese Office Action on JP2010-232591 dated Jun. 9, 2015.
Jones, Matt et al., "Improving Web Interaction in Small Displays", Computer Networks, vol. 31, pp. 1129-1137 (May 17, 1999).
Kato, Sako, "Keyword Advertisement", Internet Magazine, 2nd Stage, No. 2, pp. 112-123, Japan, Impress Holdings, Inc. (May 1, 2004).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Larson, Selena, "Google Home now recognizes your individual voice", CNN Money, San Francisco, California, Apr. 20, 2017 (3 pages).
Lee, Dave, "The five big announcements from Google I/O", BBC, May 18, 2017, 11 pages.
Microsoft Corporation, "Best Practices for Creating Adaptive User Interfaces with the Mobile Internet Toolkit", Jan. 2002, pp. 1-2, XP008144654.
Morton to Baluja email (1 pg).
Nieva, Richard, "Google Home and eBay can tell you how much that's worth", cnet, Mar. 8, 2017 (3 pages).
Notice of Final Rejection for Korean Patent Application No. 10-2007-7002383 dated Apr. 22, 2010.
Notice of Final Rejection for Korean Patent Application No. 10-2007-7002385 dated Jul. 30, 2009 (5 pgs.) with translation (5 ps.).
Notice of Final Rejection for Korean Patent Application No. 10-2010-7013914 dated Sep. 14, 2011.
Notice of Preliminary Rejection for Korean Patent Application No. 10-2007-7002383 dated Jun. 10, 2008.
Notice of Preliminary Rejection for Korean Patent Application No. 10-2007-7002385, dated Jun. 10, 2008 (5 pgs.) with translation (6 pgs.).
Notice of Preliminary Rejection for Korean Patent Application No. 10-2010-7013914, dated Sep. 17, 2010.
Notice of Reasons for Rejection for Japanese Patent Application No. 2007-519374 dated Aug. 25, 2009 (3 pgs.) with translation (4 pgs.).
Notice of Reasons for Rejection for Japanese Patent Application No. 2007-519407 dated Jul. 7, 2009.
Notification of Preliminary Rejection for Korean Patent Application No. 10-2007-7002383 dated Jun. 10, 2009.
Notification of the First Office Action for Chinese Patent Application No. 200580025826.2 dated Dec. 18, 2009 (6 pgs.) with translation (7 pgs.).
Notification of the Second Office Action for Chinese Patent Application No. 200580025826.2, dated Jul. 22, 2011 (3 pgs.) with translation (4 pgs.).
Notification of the Second Office Action for Chinese Patent Application No. 200580025878.X, dated Oct. 26, 2011.
Notification of the Third Office Action for Chinese Patent Application No. 200580025826.2 dated Apr. 11, 2012 (5 pgs.) with translation (7 pgs.).
Notification of the Third Office Action for Chinese Patent Application No. 200580025878.X, dated Feb. 21, 2012.
Office Action for Canadian Patent Application No. 2,572,471, dated May 21, 2010.
Office Action for Chinese Patent Application No. 200580025878.X, dated May 7, 2010.
Office Action for European Patent Application No. 05 763 971.8-2221 dated Mar. 29, 2011 (4 pgs.).
Office Action for European Patent Application No. 05768157.9-1958, dated Feb. 15, 2013.
Office Action for Japanese Patent Application No. 2007-519374, dated May 29, 2012 (19 pgs.) with translation (28 pgs.).
Office Action on U.S. Appl. No. 14/230,508 dated Nov. 28, 2014.
Official Letter of Inquiry for Japanese Patent Application No. 2007-519374 dated Oct. 4, 2011 (3 pgs.).
Page to Karima email (1 page).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
PCT International Search Report (PCT/ISA/210) for International Application No. PCT/US05/23023 (2 pgs.) (dated Oct. 23, 2006).
PCT Written Opinion of the International Searching Authority (PCT/ISA/237) for International Application No. PCT/US05/23023 (3 pgs.).
PCT/ISA/210, International Search Report for PCT/US05/23162 dated Feb. 5, 2007.
PCT/ISA/237, Written Opinion of the International Searching Authority forPCT/US05/23162 dated Feb. 5, 2007.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Request for Reexamination of U.S. Pat. No. 6,446,045 B1, Control No. 95/001,061 dated Jul. 7, 2008.
Request for Reexamination of U.S. Pat. No. 6,829,587 B2, Control No. 95/001,068, dated Jul. 14, 2008.
Request for Reexamination of U.S. Pat. No. 7,240,025 B2, Control No. 95/001,073, dated Jul. 30, 2008.
Request for Reexamination of U.S. Pat. No. 7,249,059 B2, Control No. 95/001,069, dated Jul. 21, 2008.
Sablich, Justin, "Planning a Trip With the Help of Google Home", New York Times, dated May 31, 2017, 6 pages.
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Shintaro Gotoh et al., "Citizens Lectures on GIS using MANDARA and EXCEL, Make a Map by PC," Kokin Shoin (1st ed., Apr. 5, 2004, ISBN 4-7722-4051-9, Kokon, Japan) p. 62.
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Statement of Grounds and Particulars in Support of Opposition for Australian Patent Application No. 2005259861, dated Jan. 22, 2010 (13 pgs.).
Statement Regarding References in 1449 Form.
Supplementary European Search Report for European Patent Application No. 05768157.9 dated Oct. 31, 2012.
Tedeschi, Bob, "Transforming Clicks Into Rings," (Jun. 7, 2004) downloaded fromwww.nytimes.com on Jun. 6, 2004, 3 pgs.
The International Search Report and The Written Opinion of the International Searching Authority for Application No. PCT/US2013/077834 dated Apr. 24, 2014, 5 pages.

(56) References Cited

OTHER PUBLICATIONS

U.S. Final Office Action on U.S. Appl. No. 13/441,298 dated Dec. 30, 2013.
U.S. Office Action on U.S. Appl. No. 10/880,686 dated May 7, 2008.
U.S. Office Action on U.S. Appl. No. 10/880,868 dated Apr. 1, 2016.
U.S. Office Action on U.S. Appl. No. 10/880,868 dated Dec. 4, 2008.
U.S. Office Action on U.S. Appl. No. 10/880,868 dated Mar. 24, 2015.
U.S. Office Action on U.S. Appl. No. 10/880,868 dated Nov. 28, 2014.
U.S. Office Action on U.S. Appl. No. 11/026,507 dated Apr. 6, 2015.
U.S. Office Action on U.S. Appl. No. 11/026,507 dated Aug. 14, 2014.
U.S. Office Action on U.S. Appl. No. 11/026,507 dated Jan. 12, 2010.
U.S. Office Action on U.S. Appl. No. 11/026,507 dated Jul. 21, 2010.
U.S. Office Action on U.S. Appl. No. 11/026,507 dated Mar. 24, 2011.
U.S. Office Action on U.S. Appl. No. 11/026,507 dated Mar. 30, 2009.
U.S. Office Action on U.S. Appl. No. 11/026,507 dated Oct. 29, 2015.
U.S. Office Action on U.S. Appl. No. 13/441,298 dated Jul. 17, 2013.
U.S. Office Action on U.S. Appl. No. 13/441,298 dated Jul. 6, 2015.
U.S. Office Action on U.S. Appl. No. 13/441,298 dated Nov. 20, 2015.
U.S. Office Action on U.S. Appl. No. 13/441,298 dated Jan. 13, 2017.
U.S. Office Action on U.S. Appl. No. 13/840,380 dated Oct. 22, 2015.
U.S. Office Action on U.S. Appl. No. 13/840380 dated Aug. 12, 2016.
U.S. Office Action on U.S. Appl. No. 13/840,380 dated Feb. 27, 2017.
U.S. Office Action on U.S. Appl. No. 14/155,323 dated May 7, 2015.
U.S. Office Action on U.S. Appl. No. 14/172,353 dated Jul. 6, 2015.
U.S. Office Action on U.S. Appl. No. 14/172,353 dated Jan. 21, 2016.
U.S. Office Action on U.S. Appl. No. 14/230,508 dated Feb. 1, 2016.
U.S. Office Action on U.S. Appl. No. 14/230,508 dated Jun. 3, 2015.
U.S. Office Action on U.S. Appl. No. 15/395,703 dated Oct. 19, 2017.
U.S. Office Action on U.S. Appl. No. 14/172,353 dated Aug. 10, 2017, 15 pages.
U.S. Office Action on U.S. Appl. No. 14/172,353 dated Feb. 9, 2017.
Willens, Max, "For publishers, Amazon Alexa holds promise but not much money (yet)", Digiday, Jul. 6, 2017, 5 pages.
Zeff, R. et al., Advertising on the Internet, 2nd Ed., John Wiley & Sons, 1999.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion on International Application No. PCT/US2017/049782, dated Oct. 25, 2017, 16 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Notice of Allowance for U.S. Appl. No. 13/441,298 dated Nov. 2, 2017, 11 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that: Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Notice of Allowance on U.S. Appl. No. 15/395,703 dated Feb. 14, 2018.
U.S. Office Action for U.S. Appl. No. 13/840,380 dated Dec. 6, 2017, 13 pages.
Buckland et al., "Amazon's Alexa Takes Open-Source Route to Beat Google Into Cars", Bloomberg, Feb. 27, 2018, 6 pages.
International Preliminary Report on Patentability (Chapter 1 of the Patent Cooperation Treaty) for application No. 31549-00189 dated Aug. 13, 2015.
U.S. Notice of Allowance for U.S. Appl. No. 15/395,703 dated Apr. 4, 2018, 2 pages.
U.S. Notice of Allowance on U.S. Appl. No. 15/395,703 dated May 17, 2018.
U.S. Office Action for U.S. Appl. No. 14/172,353 dated Apr. 4, 2018, 22 pages.
U.S. Office Action on U.S. Appl. No. 14/172,353 dated May 17, 2018.

* cited by examiner

Establish a connection over the Internet with a computing device
— B310

Receive data from the computing device during the connection
— B320

Extract signal from the received data
— B330

Estimate a relative age of the computing device based on the extracted signal
— B340

Select a service from a plurality of services based on the estimated relative age
— B350

Provide the selected service to the computing device
— B360

FIG. 3

METHODS AND SYSTEMS FOR IDENTIFYING NEW COMPUTERS AND PROVIDING MATCHING SERVICES

TECHNICAL FIELD

The disclosure relates generally to the field of service providing systems and methods, and, in particular, to systems and methods for matching content to user interests.

BACKGROUND

The Internet provides access to a wide variety of content. The ability to search that content and provide intelligent search results to a user continues to be a challenge. Moreover, providing content related to services or items that the user would like to purchase can be beneficial to both the users and the content providers.

Content providers decide which content is displayed using various advertising management tools. These tools also allow a content provider to track the performance of various content items or content campaigns. The parameters used to determine when to display a particular content item can also be changed using advertising management tools.

SUMMARY OF THE DISCLOSURE

A method of providing services to computing devices includes, but is not limited to, any one or combination of: (i) establishing a connection over the Internet with a computing device; (ii) receiving data from the computing device during the connection; (iii) extracting a signal from the data received from the computing device; (iv) estimating a relative age of the computing device based on the extracted signal; (v) selecting a service from a plurality of services based on the estimated relative age of the computing device; and (vi) providing the selected service to the computing device.

In various implementations, the extracted signal comprises a unique identifier of the computing device. In some implementations, the estimating includes analyzing the unique identifier of the computing device for a pattern. The relative age of the computing device is estimated based on the pattern. In further implementations, the estimating includes comparing the pattern with a database of known patterns for corresponding respective relative ages to estimate the relative age of the computing device.

In various implementations, the estimated relative age of the computing device comprises an estimated relative age range of the computing device. In some implementations, the estimated relative age of the computing device includes a probability that the relative age of the computing device is in the estimated relative age range of the computing device.

In various implementations, the relative age of the computing device is estimated based on an amount of certain information provided in the extracted signal. In some implementations, the estimated relative age is a first relative age if the amount of the certain information provided in the extracted signal is less than a specified threshold. The estimated relative age is a second relative age if the amount of the certain information provided in the extracted signal is or exceeds a specified threshold.

In various implementations, the relative age of the computing device is estimated based on presence or absence of certain information provided in the extracted signal. In some implementations, the estimated relative age is a first relative age if the certain information is present in the extracted signal. The estimated relative age is a second relative age if the certain information is absent in the extracted signal.

In various implementations, the relative age of the computing device is estimated based on order of certain information provided in the extracted signal. In some implementations, the estimated relative age is a first relative age if the order of the certain information is in a predetermined order. The estimated relative age is a second relative age if the order of the certain information is not in the predetermined order.

In various implementations, the method further includes providing a query or command to the computing device. The data is received from the computing device in response to the query or command.

In some implementations, the extracted signal provides information relating to latency of performance of the computing device in response to the query or command. The relative age is estimated based on the latency of the computing device.

In various implementations, the service comprises an advertisement.

In various implementations, the selecting includes selecting an advertisement campaign from a plurality of advertisement campaigns based on the estimated relative age of the computing device.

In various implementations, the selecting includes selecting an advertisement, provided on a server, from a plurality of advertisements based on the estimated relative age of the computing device. The providing includes delivering the selected advertisement to the computing device.

In various implementations, a first service is selected from the plurality of services if the estimated relative age of the computing device is less than a specified threshold. A second service is selected from the plurality of services if the estimated relative age of the computing device is or exceeds the specified threshold.

In various implementations, the service comprises an offer. The selecting includes selecting an offer from a plurality of offers based on the estimated relative age of the computing device. The providing includes delivering the offer to the computing device. In some implementations, the offer includes providing a benefit to a user in response to the user performing a predetermined action. In further implementations, the predetermined action comprises changing a default configuration of the computing device. In yet further implementations, the default configuration of the computing device comprises a default search engine for the computing device. In yet further implementations, the default configuration of the computing device comprises a default browser for the computing device.

An apparatus for providing services includes, but is not limited to any one or combination of, means for establishing a connection over the Internet with a computing device; means for receiving data from the computing device during the connection; means for extracting a signal from the data received from the computing device; means for estimating a relative age of the computing device based on the extracted signal; means for selecting a service from a plurality of services based on the estimated relative age of the computing device; and means for providing the selected service to the computing device.

An apparatus for providing services includes, but is not limited to any one or combination of a processor configured for establishing a connection over the Internet with a computing device. The processor configured for receiving data from the computing device during the connection. The processor configured for extracting a signal from the data received from the computing device. The processor configured for estimating a relative age of the computing device based on the extracted signal. The processor configured for selecting a service from a plurality of services based on the estimated relative age of the computing device. The processor configured for providing the selected service to the computing device.

A computer program product for providing services, the computer program product including a non-transitory computer-readable storage medium having code for (but not limited to any one or combination of): (i) establishing a connection over the Internet with a computing device; (ii) receiving data from the computing device during the connection; (iii) extracting a signal from the data received from the computing device; (iv) estimating a relative age of the computing device based on the extracted signal; (v) selecting a service from a plurality of services based on the estimated relative age of the computing device; and (vi) providing the selected service to the computing device.

DETAILED DESCRIPTION

Various implementations relate to systems and methods for determining a relative age of a computing device based on characteristics and patterns in transmitted identifiers sent by the computing device to a server (e.g., internet content server). Accordingly, services may be provided to the computing device based on the relative age of the computing device. In particular implementations the systems and methods identify new computing devices connecting to the Internet for one of the first few times time to provide such computing devices with services, such as (but not limited to) content providing, appropriate for new computing devices.

Figure 1:
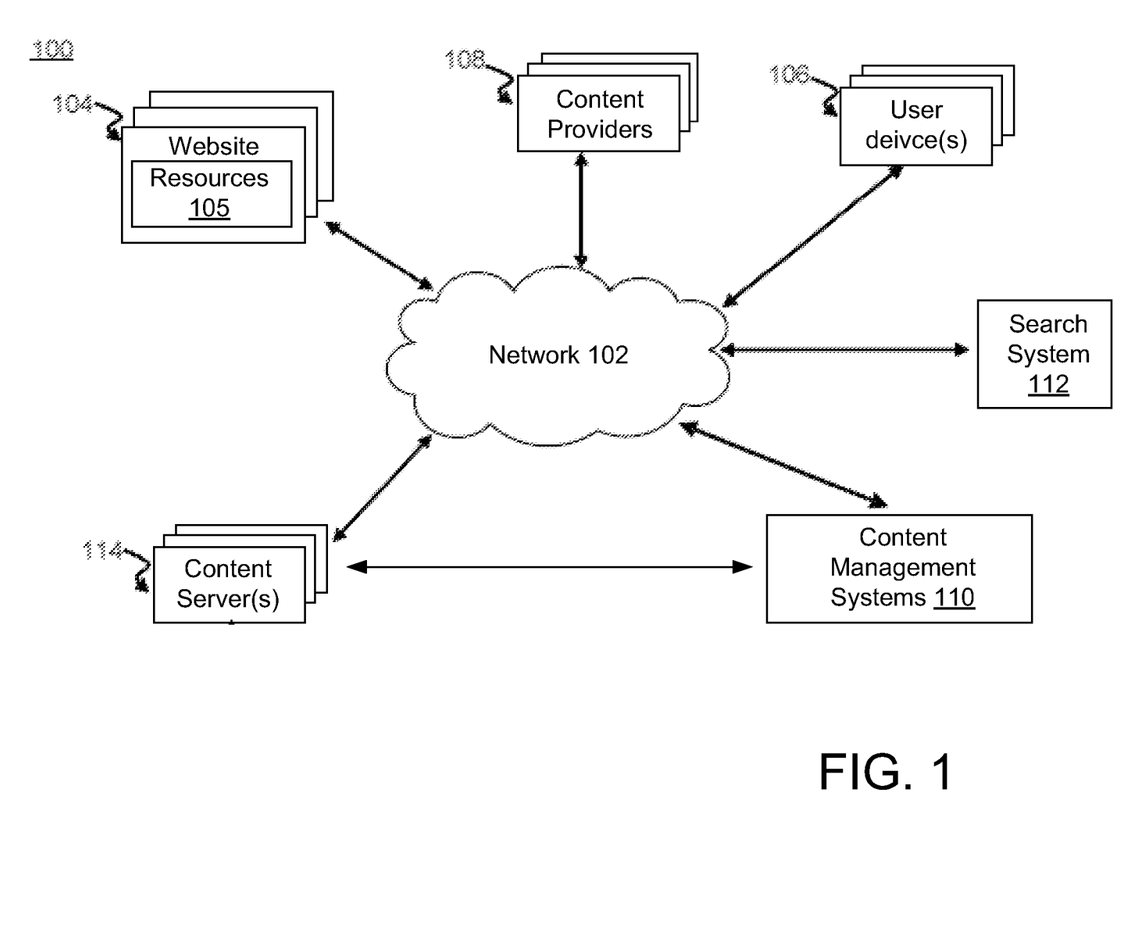
FIG. 1 is a block diagram of an environment in which an advertisement management system manages advertising services according to various implementations of the disclosure.

FIG. 1 is a block diagram of an environment in which a content management system manages content-providing services. The environment 100 includes a network 102, such as a local area network (LAN), a wide area network (WAN), the Internet, or a combination thereof. The network 102 connects websites 104, user devices 106, content providers 108, and a content management system 110. The environment 100 may include many thousands of websites 104, user devices 106, and content providers 108.

The website 104 is one or more resources 105 associated with a domain name and hosted by one or more servers. For instance, a website may be a collection of web pages formatted in hypertext markup language (HTML) that can contain text, images, multimedia content, and programming elements, such as scripts.

The resource 105 is any data that can be provided over the network 102. The resource 105 is identified by a resource address that is associated with the resource 105, such as a uniform resource locator (URL). The resource 105 may include web pages, word processing documents, portable document format (PDF) documents, images, video, programming elements, interactive content, feed sources, and/ or any other type of content. The resource 105 can include content, such as words, phrases, images, and sounds, which may include embedded information (such as meta-information in hyperlinks) and/or embedded instructions (such as JavaScript™ scripts).

The user device 106 is an electronic device that is controllable by a user and is capable of requesting and receiving resources (e.g., 105) over the network 102. User devices 106 may include, but are not limited to, personal computers, mobile communication devices, and other devices that can send and receive data over the network 102. The user device 106 typically includes a user application, such as a web browser, to facilitate the sending and receiving of data over the network 102. The user device 106 may also be referred to as a computing device.

The user device 106 can request the resources 105 from the website 104. In turn, data representing the resource 105 can be provided to the user device 106 for presentation by the user device 106. The data representing the resource 105 can include data specifying a portion of the resource 105 or a portion of a user display (e.g., a presentation location of a pop-up window or in a slot of a web page) in which content or other sponsored content can be presented. These specified portions of the resource 105 or user display are referred to as content slots. In some implementations, "content" may refer to an advertisement. In such implementations, for instance, "content provider" may refer advertisers or the like.

To facilitate searching of the vast number of resources 105 accessible over the network 102, the environment 100 can include a search system 112 that identifies the resources 105 by crawling and indexing the resources provided on the websites 104. Data about the resources can be indexed based on the resource with which the data is associated. The indexed and, optionally, cached copies of the resources are stored in a search index (not shown).

The user device 106 can submit search queries to the search system 112 over the network 102. In response, the search system 112 accesses the search index to identify resources that are relevant to the search query. In some implementations, a search query includes one or more keywords. The search system 112 identifies the relevant resources 105 in the form of search results and returns the search results to the user device 106 in search results pages. A search result is data generated by the search system 112 that identifies the resources 105 that are responsive to a particular search query, and includes a link to the resource 105. For instance, a search result can include a web page title, a snippet of text or a portion of an image extracted from the web page, a rendering of the resource, and the URL of the web page. Search results pages can also include one or more content slots in which content can be presented.

A search result page can be sent with a request from the search system 112 for the web browser of the user device 106 to set an HTTP (HyperText Transfer Protocol) cookie. A cookie can represent, for example, a particular user device 106 and a particular web browser. For example, the search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifiers are anonymized and are not connected with user names. Because HTTP is a stateless protocol, the use of cookies allows an external service, such as the search system 112 or other system, to follow particular actions and status of a user over multiple sessions. A user may, at any time, opt out of allowing user actions to be followed, for example, by disabling cookies in the browser's settings. According to various implementations, the search system 112 does not follow user identifying information. In some implementations, a user may be required to opt in to enable user actions to be followed.

When a resource 105 or search results are requested by the user device 106, the content management system 110 receives a request for content to be provided with the resource 105 or search results. The request for content can include characteristics of the content slots that are defined for the requested resource or search results page and can be provided to the content management system 110. For example, a reference (e.g., URL) to the resource 105 for which the content slot is defined, a size of the content slot, a position of the content slot within the resources, and/or media types that are available for presentation in the content slot can be provided to the content management system 110. Similarly, keywords (i.e., one or more words that are associated with content) associated with a requested resource ("resource keywords") or a search query for which search results are requested can also be provided to the content management system 110 to facilitate identification of content that are relevant to the resource 105 or search query.

Using data included in the request for content, the content management system 110 can select content that are eligible to be provided in response to the request ("eligible content" or "candidate content"). For example, eligible content can include content having characteristics matching the characteristics of content slots and that are identified as relevant to specified resource keywords or search queries. In some implementations, content having keywords that match the resource keywords or the search query are selected as eligible content by the content management system 110.

The content management system 110 selects an eligible content for each content slot of a resource 105 or of a search results page. The resource 105 or search results page is received by the user device 106 for presentation to the user. In some implementations, the selected content is delivered to the user device via one or more content servers 114.

The content providers 108 can submit, to the content management system 110, campaign parameters (e.g., matching keywords and corresponding bids) that are used to control distribution of content. The content providers 108 can access the content management system 110 to monitor performance of the content that are distributed using the campaign parameters. For example, a content provider can access a campaign performance report that provides a number of impressions (i.e., presentations), selections (i.e., clicks), and conversions that have been identified for the content.

The campaign performance report can also provide a total cost, a cost-per-click, and other cost measures for the content over a specified period. For example, a content provider may access a performance report that specifies that content distributed using the phrase match keyword "hockey" have received 1,000 impressions (i.e., have been presented 1,000 times), have been selected (e.g., clicked) 20 times, and have been credited with 5 conversions. Thus, the phrase match keyword "hockey" can be attributed with 1,000 impressions, 20 clicks, and 5 conversions.

One example of online content offers pay-per-click (PPC) content providing, cost-per-thousand (CPM) content providing, and site-specific content providing for text, banner, and rich-media content. The program includes local, national, and international distribution. The text content can be short, generally comprising one headline of 25 characters and two additional text lines of 35 characters each. Image content can be one of several different Interactive Advertising Bureau (IAB) standard sizes.

In some implementations in which the content campaign comprises a PPC content, content providers select the words that should trigger their content and the maximum amount they will pay per click. When a user searches on a search engine, content for relevant words appear as "sponsored links" on the (right or left) side of the page, and sometimes above or below the main search results. In some implementations, content can appear on any portion of a page. The ordering of the paid-for listings can depend on other content providers' bids (PPC) and factors such as the "quality score" of all content shown for a given search. In some implementations, the content management system 110 determines the factors based on historical click-through rates, predicted click-through rates, relevance of a content provider's content text and keywords, a content provider's account history, and other relevance factors. The quality score can be also used to set the minimum bids for a content provider's keywords. The minimum bid takes into consideration the quality of the landing page as well, which includes the relevancy and originality of content, navigability, and transparency into the nature of the business.

In some implementations, a "user" may refer to any company, organization, partnership, individual, agent, or entity that is involved in online content providing. Thus, in some implementations "user" and "content provider" can be used interchangeable. Keyword coverage refers to the number of searches done by "search engine users" that result in a paid result—content—being displayed. For example, 50% of searches conducted on a search engine may result in a paid content being displayed. Out of that, 1% of the searches may result in a specific content provider's URL being provided. In general, the online content provider's goal is to have its content appear on a display page after as many relevant searches as possible. One way a content provider can extend their keyword coverage is by purchasing additional keywords, thus increasing the likelihood that their content will appear on displays of search results. The number of paid results per keyword can vary, and where a URL ranks among the paid results can depend on several factors, including relevancy and the keyword purchase price.

There are several ways a content provider selects keywords to purchase. For example, a content provider can select a group of keywords that define the products, services, or content it offers on its web page. A content provider may try to expand its keyword selection by selecting all synonyms, or by selecting keywords that are related, in some manner, to the products, services or content it offers on its web page. A content provider may try to optimize its selection of keywords by monitoring how effective each keyword is. For example, the content provider may use a tool that records the number of times a purchased keyword is entered into a search engine and the number of times that results in their web page being viewed.

Figure 2:
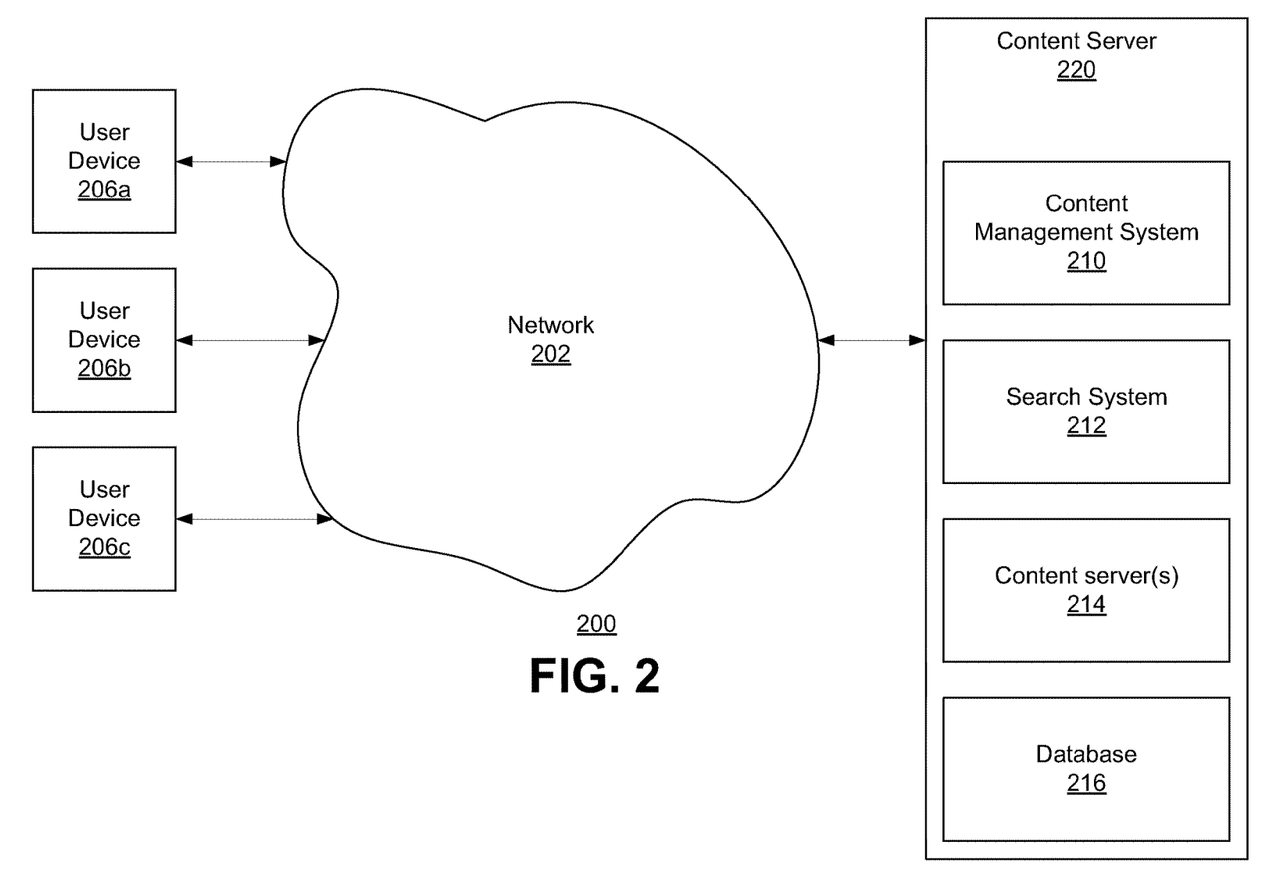
FIG. 2 is block diagram of an environment for providing services according to various implementations of the disclosure.

FIG. 2 is a block diagram of an environment 200 for providing services. With reference to FIGS. 1 and 2, the environment 200 may correspond to the environment 100 (or a portion thereof). For instance, network 202 (e.g., Internet) may correspond to the network 102, content management system 210 may correspond to the content management system 110, search system 212 may correspond to the search system 112, content server 214 may correspond to the content server 214. User devices 206a-206c (referred to collectively or individually as 206) may correspond to the user devices 106. The user device 206 may be referred to as a computing device 206. In various implementations, the environment 200 may include other components of the environment 100.

The computer device 206 may be for example, but not limited to, one or more of a desktop computer, a network computer, a midrange computer, a mainframe computer, and/or the like. In addition, the computer device 206 be for example, but not limited to, one or more of be a remote or portable computing system such as a laptop computer, a netbook computer, a tablet computer, a personal digital assistant (PDA), a cellular telephone, other wireless device, and/or the like. The computer device 206 may be a stand-alone system or part of a network environment. In other implementations, the computer device 206 may be any electronic device, such as, but not limited to, a display device, a television, a video game system, a media player, set-top box, and/or the like.

In various implementations, the computer device 206 is or includes a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device.

A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content that is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user.

A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

In various implementations, one or more components of the environment 200 may be provided or otherwise used with on a server or group of servers. The server (or group of servers) may be an internet content server 220. For instance, the internet content server 220 may include or be used with any one or more of the content management system 210, the search system 212, and the content server 214.

In various implementations, the content server 220 is configured to estimate or otherwise determine a relative age of a computing device 206 when the computing device 206 is connected to the content server 220 over the Internet 202. In particular implementations, by estimating the relative age of the computing device 206, the content server 220 may identify if the computing device 206 is a "new" computing device (e.g., the computing device 206 is connecting to the content server 220 and/or the Internet 202 for the first time).

Figure 3:
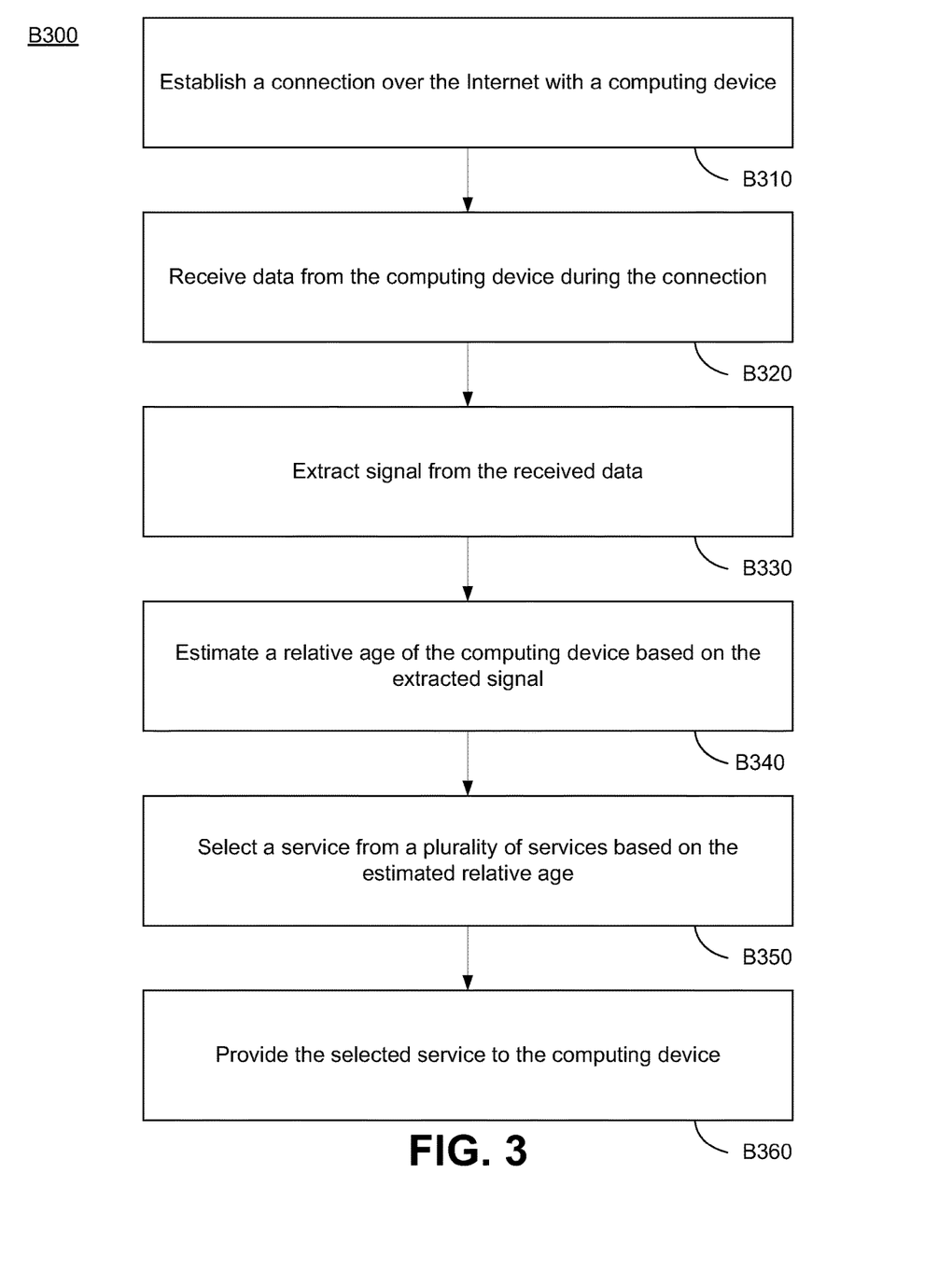
FIG. 3 illustrates a method for providing services according to various implementations of the disclosure.

FIG. 3 illustrates a method B300 that may be used to estimate a relative age of a computing device. With reference to FIGS. 1-3, at block B310, the content server 220 establishes a connection over the Internet 202 with the computing device 206. This may occur, for instance, when the computing device 206 connects with the content server 220 to access a service provided by the content server 220.

At block B320, the content server 220 receives data from the computing device 206. The data may be received at any suitable time, such as when the connection is established or at any time during the connection. For instance, in particular implementations, the data may be sent by a browser on the computing device 206 in an HTTP header or the like. In other implementations, the data may be passed through various application or device-specific protocols, protocol buffers, or any other system that involves remote procedure calls.

At block B330, the content server 220 may extract a signal from the received data. As discussed in (but not limited to) the disclosure, the signal may correspond to information relating to the computing device 206 that may be used to estimate a relative age of the computing device 206.

In some implementations, the extracted signal corresponds to a unique identifier (e.g., Media Access Control (MAC) address, serial number, etc.) assigned to the computing device 206 (or component thereof) for instance during manufacture of the computing device 206. The unique identifier may be used to estimate the relative age of the computing device 206.

At block B340, the content server 220 may use the extracted signal to estimate the relative age of the computing device.

In various implementations, the content server 220 includes a database 216 containing information (e.g., algorithms, models, catalogs, etc.) for estimating the relative age of computing device 206 based on the extracted signal of the computing device 206. For instance, if the extracted signal corresponds to a given unique identifier, such as a serial number, for the computing device 206, the given serial number (e.g., a portion thereof) may be cross-referenced with a catalog of manufacturers in the database 216 to determine the manufacturer of the computing device 206. Then, information relating to the determined manufacturer of the computing device 206 provided in the database 216 may be used with the given serial number (e.g., a remaining or portion thereof) to estimate the relative age of the computing device 206. Accordingly, for instance, the relative age of the computing device 206 may be estimated with some degree of probability to have been manufactured on a given date or date range.

In some implementations, the content server 220 analyzes the unique identifier for a pattern or characteristic. The pattern may be cross-referenced with a catalog of know patterns in the database 216 to estimate the relative age of the computing device 206.

Some or all of the information in the database 216 may be provided therein in any suitable manner, for instance by administrators or users of the database 216, by manufacturers, and/or the like. In particular implementations, the information in the database 216 is heuristic information that may allow the relative age of the computing device 206 to be estimated based on the extracted signal of the computing device 206.

As a computing device is used over time, the computing device 206 begins to accumulate a variety of usage information (e.g., installed programs, cache information, cookies, access and modification timestamps for certain files or resources, disk fragmentation statistics, flash memory write counters, temperature and motion sensing data, cookies, browser plugins, browser version, browser user-agent composition, etc.). Thus, in some implementations, some of the usage information may be represented in the signal extracted from the data received from the computing device 206 and may be a basis for estimating the relative age of the computing device 206.

In some implementations, an amount of certain information provided in the extracted signal may be used to determine the relative age of the computing device 206. For instance, a computing device 206 that is relatively new will generally have less usage information (e.g., less than a predetermined amount of usage information) than a computing device 206 that is older. In particular implementations, the predetermined amount of usage information for a given relative age for a computing device 206 may be determined heuristically (e.g., the predetermine amount is based on usage information typically found on a computing device 206 for the given relative age). Thus, for example, if the amount of usage information of the computing device 206, for instance as represented in the extracted signal, is less than the predetermined threshold (e.g., for a computing device 206 that is less than one month in use), a relative age for the computing device 206 may be estimated to be less than one month. If the amount of usage information, for instance as represented in the extracted signal, is more than the predetermined threshold, the relative age for the computing device 206 may be estimated to be more than one month.

In some implementations, a presence or absence of information provided in the extracted signal may be used to determine the relative age of the computing device 206. For instance, a computing device 206 that is relatively new will be more likely to have an absence of certain information (e.g., information representative of missing hardware, such as, a disk drive, hard disk drive, Ethernet connectors, monitor connectors, information representative of missing software or data, and/or the like) than a computing device 206 that is older. For instance, an absence of predetermined software or data (e.g., browser plug-in) that does not come pre-installed on the computing device and must be downloaded (e.g., by the user) from the Internet may suggest that the computing device 206 is relatively new, whereas a presence of such software or data may suggest that the computing device is not relatively new. In particular implementations, the certain information that is determined to be present or absent may be determined heuristically (e.g., the certain information is based on information typically found on a computing device 206 for the given relative age). Thus, for example, if the certain information of the computing device 206, for instance as represented in the extracted signal, is absent (e.g., for a computing device 206 that is less than one month in use), a relative age for the computing device 206 may be estimated to be less than one month. If the certain information, for instance as represented in the extracted signal, is present, the relative age for the computing device 206 may be estimated to be more than one month.

In some implementations, an order of information provided in the extracted signal may be used to determine the relative age of the computing device 206. For instance, a computing device 206 that is relatively new will be more likely to have a predetermined order (e.g., access and modification timestamps on a certain set up files when initially installed, web browser user agent, order of registry settings, etc.) than a computing device 206 that is older. In particular implementations, the order of the information may be determined heuristically (e.g., the order of the certain information is based on an order for such information typically found on a computing device 206 for the given relative age). Thus, for example, if the order of the certain information of the computing device 206, for instance as represented in the extracted signal, is a predetermined order (e.g., for a computing device 206 that is less than one month in use), a relative age for the computing device 206 may be estimated to be less than one month. If the order for the certain information, for instance as represented in the extracted signal, is not the predetermined order, the relative age for the computing device 206 may be estimated to be more than one month.

In some implementations, the content server 220 sends a query or command to the computing device 206. In such implementations, the extracted signal may correspond to a response or output provided in the data by the computing device 206 in response to the query or command. As such, the response or output may be used by the content server 220 to estimate a relative age of the computing device 206. For instance, if latency or performance of the computing device 206, which may be determined from the response or output, is below a specified threshold, the relative age of the computing device 206 may be estimated to be less than if the latency or performance of the computing device 206 was equal to or above the specified threshold. In particular implementations, the response or output may be used to determine information (e.g., component/manufacturer identity, firmware/software version, etc.) for estimating the relative age of the computing device 206. For instance, processor chips may have different floating point algorithms so that one chip may output a first response and another chip may output a second, different response. As such, the query may request the computing device 206 to execute a specified command such that the output to the command may be used to identify the processor chip of the computing device 206. The identity of the chip, for instance, may be used along with other information (e.g., a serial number) to estimate the relative age of the processor chip and/or the computing device 206, for instance in a manner discussed in (but not limited to) the disclosure.

At block B350, a service for providing to the computing device 206 may be selected based on the estimated relative age of the computing device 206. At block B360, the content server 220 may provide the selected service to the computing device 206.

In some implementations, the content server 220 (e.g., the content management system 110) selects an eligible content for each content slot of a website resource 105 or of a search results page based on the estimated relative age of the computing device 206. For instance, if the computing device 206 is determined to be relatively new (e.g., have a relative age of less than one month), content that may interest a user of a new computing device may be selected (e.g., advertisements for accessories, warranty plans, software, etc.). Also, for instance, if the computing device 206 is determined to be relatively old (e.g., have a relative age of more than two years), content that may interest a user of such a computing device may be selected (e.g., advertisements for new computers, hardware component upgrades, etc.). Accordingly, such implementations provide users with content that are more likely to interest them.

In some implementations, the content server 220 selects an offer for presenting to a user of the computing device 206 based on the estimated relative age of the computing device 206. For instance, if the computing device 206 is determined to be relatively new (e.g., have a relative age of less than one month), the content server 220 may select a first offer that provides a first benefit to the user. Likewise, if the computing device 206 is determined not to be relatively new (e.g., having a relative age of more than one month), the content server 220 may select a second offer that provides a second benefit to the user. In particular implementations, the offer may provide a benefit (e.g., credits, merchandise, services, products, discounts, etc.) that is contingent to the user performing a predetermined action, such as (but not limited to) configuring the user's computing device, browser, software, etc. in a predetermine manner. For instance, a user of a relatively new computing device may receive an offer for a benefit if the user changes the default search engine on the user's computing device to a predetermined search engine (e.g., google.com) or if the user changes the default browser on the user's computing device to a predetermined browser (e.g., Chrome). A user of a computing device that is not relatively new may not receive an offer as such a user is more likely to be content with his or her current configuration. In other cases, a user of a computing device that is not relatively new may receive a different offer, for instance one having a larger benefit to provide incentive to the user to perform the predetermined action.

In various implementations, the estimated relative age of the computing device is a date range (e.g., the estimated relative age is between zero and three months). In particular implementations, the estimated relative age of the computing device 206 includes a statistical probability that the estimated relative age of the computing device 206 is correct (e.g., 95% probability that a given computing device has a relative age of between zero and three months). In further implementations, the probability (along with the estimated relative age) is a basis for selecting and/or providing a service (e.g., B260 and B270).

In some implementations, the relative age of the computing device 206 refers to an amount of time since the computing device 206 has been manufactured. In some implementations, the relative age of the computing device 206 refers to an amount of time that the computing device 206 has been used (e.g., total time powered on, total time with active usage by a user, total time connected to Internet, etc.). In some implementations, the relative age of the computing device 206 refers to an amount of time since the computing device 206 was first used.

In some implementations, the relative age is estimated for the computing device 206 as a whole. In other implementations, the relative age is estimated for one or more hardware (e.g., hard drive, Ethernet card, etc.) or software (e.g., operating system, browser, etc.) components of the computing device 206.

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A method comprising:
    receiving, by a server, data from a computing device via a connection established between the server and the computing device, the data including a first identifier of the computing device that is assigned to the computing device by a manufacturer of the computing device and unique to the computing device;
    extracting, by the server, the first identifier of the computing device from the data received from the computing device;
    performing, by the server, using the extracted first identifier, a lookup in a database to identify an estimated date of manufacture of the computing device;
    assigning, by the server, a second identifier generated by the server to the computing device;
    associating, by the server, the estimated date of manufacture with the second identifier assigned to the computing device by the server;
    selecting, by the server, from a plurality of candidate services, a service contingent on a change in a configuration of the computing device and based on the estimated date of manufacture of the computing device;
    detecting, by the server, from subsequent data received from the computing device, the change in the configuration of the computing device; and
    providing, by the server, to the computing device, the selected service responsive to the change in the configuration of the computing device.

2. The method of claim 1, wherein the extracted first identifier comprises a unique identifier of the computing device.

3. The method of claim 2, further comprising identifying a characteristic of the unique identifier of the computing device;
    wherein the date of manufacture of the computing device is estimated based on the identified characteristic of the unique identifier.

4. The method of claim 3, wherein the database is a database of known characteristics and further comprising comparing the identified characteristic of the unique identifier with the database of known characteristics for corresponding dates of manufacture to estimate the date of manufacture of the computing device.

5. The method of claim 1, wherein the estimated date of manufacture of the computing device comprises an estimated date of manufacture range of the computing device.

6. The method of claim 5, wherein the estimated date of manufacture of the computing device comprises a probability that the date of manufacture of the computing device is in the estimated date of manufacture range of the computing device.

7. The method of claim 1, wherein the date of manufacture of the computing device is estimated based on an amount of certain information provided in the extracted first identifier.

8. The method of claim 1, wherein the date of manufacture of the computing device is estimated based on presence or absence of certain information provided in the extracted first identifier.

9. The method of claim 8,
    wherein the estimated date of manufacture is a first date of manufacture if the certain information is present in the extracted first identifier; and
    wherein the estimated date of manufacture is a second date of manufacture if the certain information is absent in the extracted first identifier.

10. The method of claim 1, wherein the date of manufacture of the computing device is estimated based on order of certain information provided in the extracted first identifier.

11. The method of claim 10,
    wherein the estimated date of manufacture is a first date of manufacture if the order of the certain information is in a predetermined order; and
    wherein the estimated date of manufacture is a second date of manufacture if the order of the certain information is not in the predetermined order.

12. The method of claim 1, further comprising providing a query or command to the computing device;
    wherein the data is received from the computing device in response to the query or command.

13. The method of claim 12,
    wherein the extracted first identifier provides information relating to latency of performance of the computing device in response to the query or command; and
    wherein the date of manufacture is estimated based on the latency of the computing device.

14. The method of claim 1, wherein providing the selected service comprises providing a content item.

15. The method of claim 1, further comprising:
    selecting a content item, by the server, from a plurality of content items based on the estimated date of manufacture of the computing device; and
    delivering the selected content item to the computing device.

16. The method of claim 1,
wherein a first service is selected from the plurality of services if the estimated date of manufacture of the computing device is less than a specified threshold; and
wherein a second service is selected from the plurality of services if the estimated date of manufacture of the computing device is or exceeds the specified threshold.

17. The method of claim 1, wherein the change in the configuration of the computing device comprises changing a default configuration of the computing device.

18. The method of claim 1, wherein the change in the configuration of the computing device comprises changing a default search engine for the computing device.

19. The method of claim 1, wherein the change in the configuration of the computing device comprises changing a default browser for the computing device.

20. An apparatus comprising:
a processor configured for:
receiving data from a computing device via a connection established between the processor and the computing device, the data including a first identifier of the computing device that is assigned to the computing device by a manufacturer of the computing device and unique to the computing device;
extracting the first identifier of the computing device from the data received from the computing device;
performing, using the extracted first identifier, a lookup in a database to identify an estimated date of manufacture of the computing device;
assigning a second identifier generated by the processor to the computing device;
associating the estimated date of manufacture with the second identifier assigned to the computing device by the processor;
selecting from a plurality of candidate services, a service contingent on a change in a configuration of the computing device and based on the estimated date of manufacture of the computing device;
detecting, from subsequent data received from the computing device, the change in the configuration of the computing device; and
providing, to the computing device, the selected service responsive to the change in the configuration of the computing device.

21. A computer program product comprising:
a non-transitory computer-readable storage medium comprising code for:
receiving data from a computing device via a connection established between the server and the computing device, the data including a first identifier of the computing device that is assigned to the computing device by a manufacturer of the computing device and unique to the computing device;
extracting the first identifier of the computing device from the data received from the computing device;
performing using the extracted first identifier, a lookup in a database to identify an estimated date of manufacture of the computing device;
assigning a second identifier generated by the server to the computing device;
associating the estimated date of manufacture with the second identifier assigned to the computing device by the server;
selecting from a plurality of candidate services, a service contingent on a change in a configuration of the computing device and based on the estimated date of manufacture of the computing device;
detecting, from subsequent data received from the computing device, a change in a configuration of the computing device; and
providing, to the computing device, the selected service responsive to the change in the configuration of the computing device.

\* \* \* \* \*